R. E. WAGNER & W. E. LAIRD.
ELECTRIC WELDING MACHINE.
APPLICATION FILED APR. 20, 1918.
1,282,502.
Patented Oct. 22, 1918.
3 SHEETS—SHEET 1.
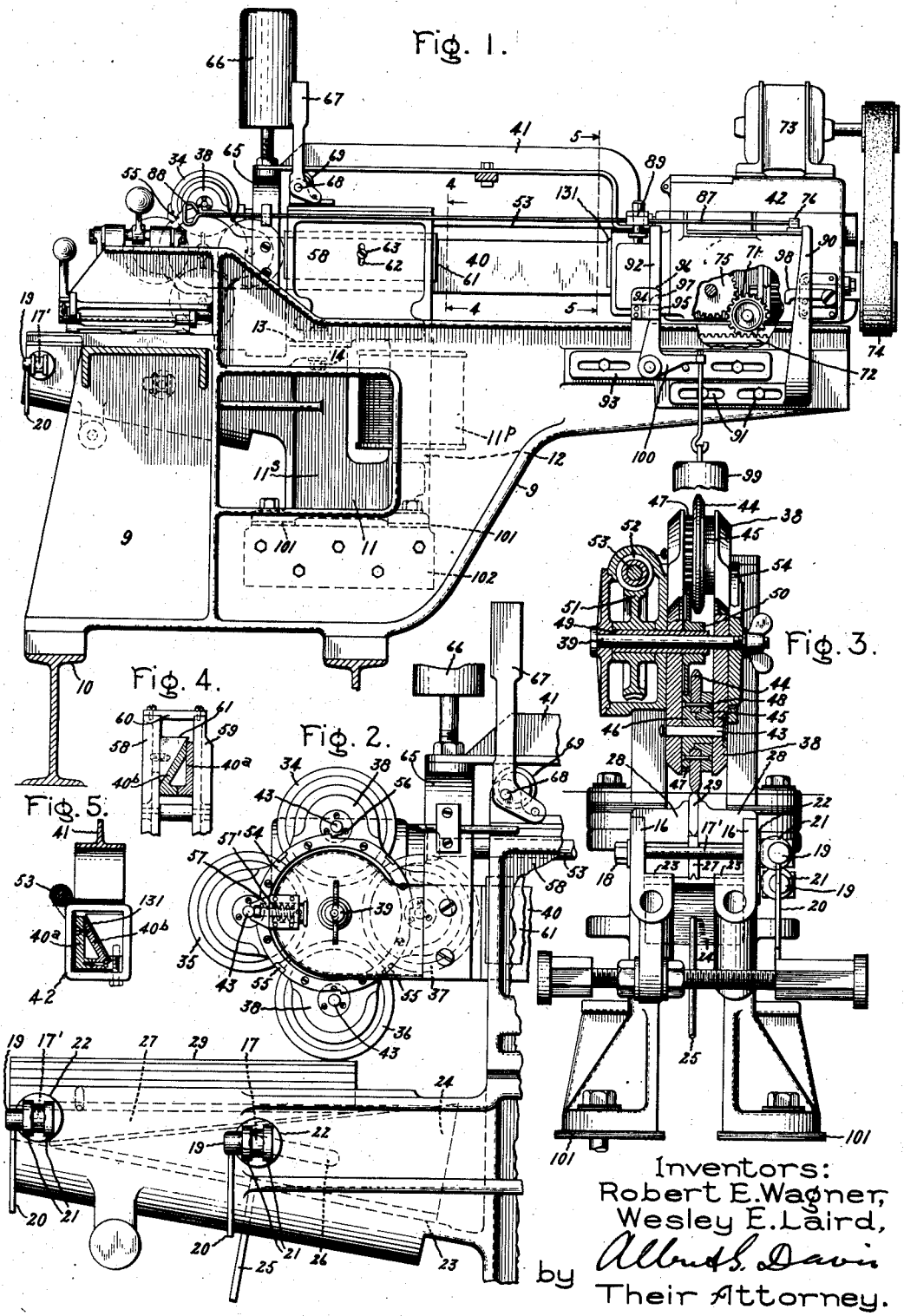
Inventors:
Robert E. Wagner,
Wesley E. Laird,
by Albert G. Davis
Their Attorney.

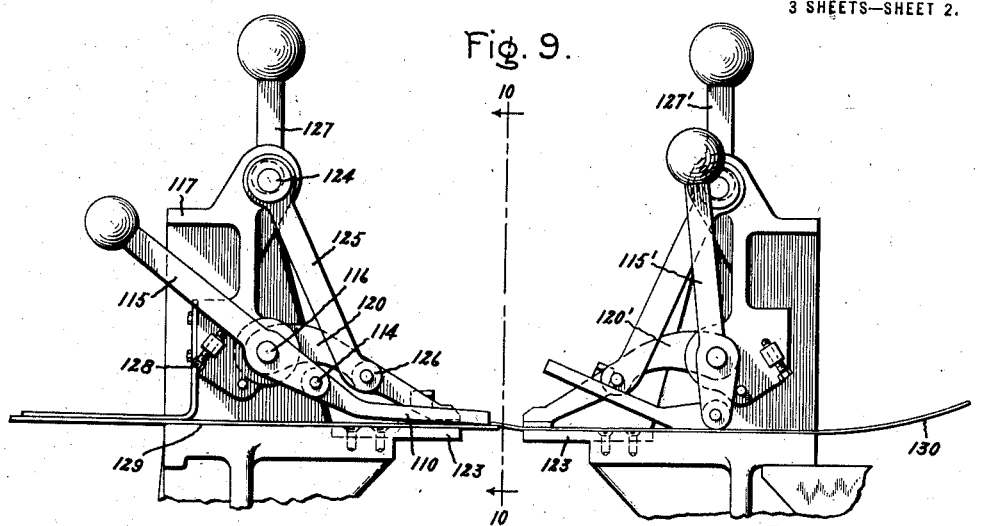
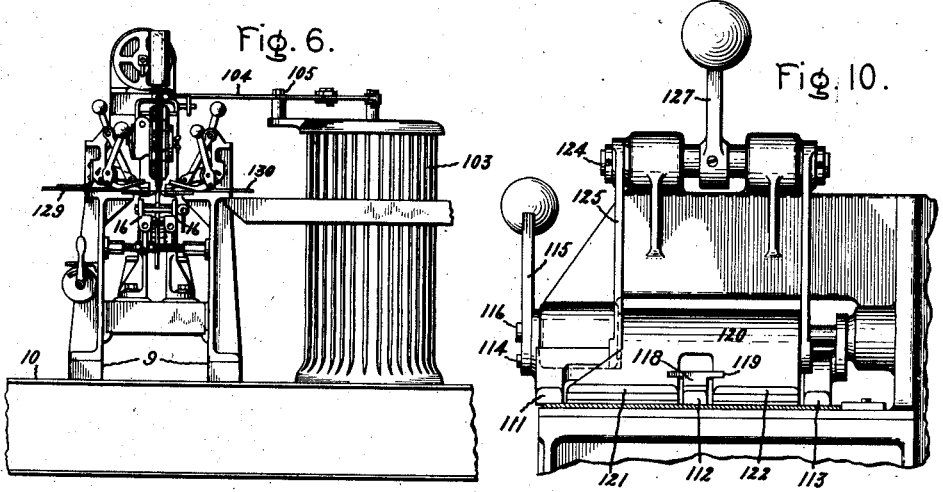
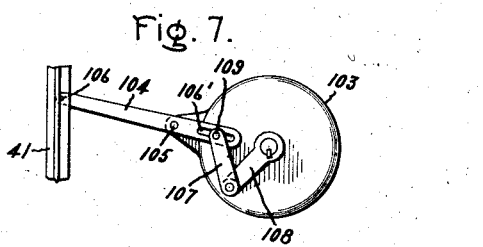
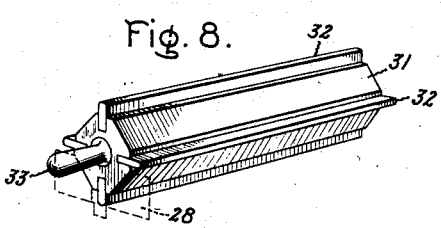
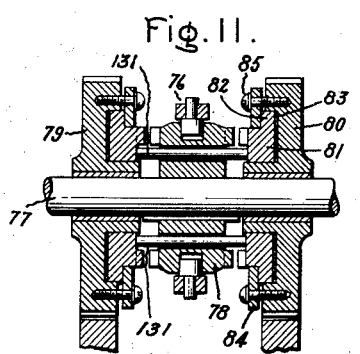
Inventors:
Robert E. Wagner,
Wesley E. Laird,
by Albert G. Davis
Their Attorney.

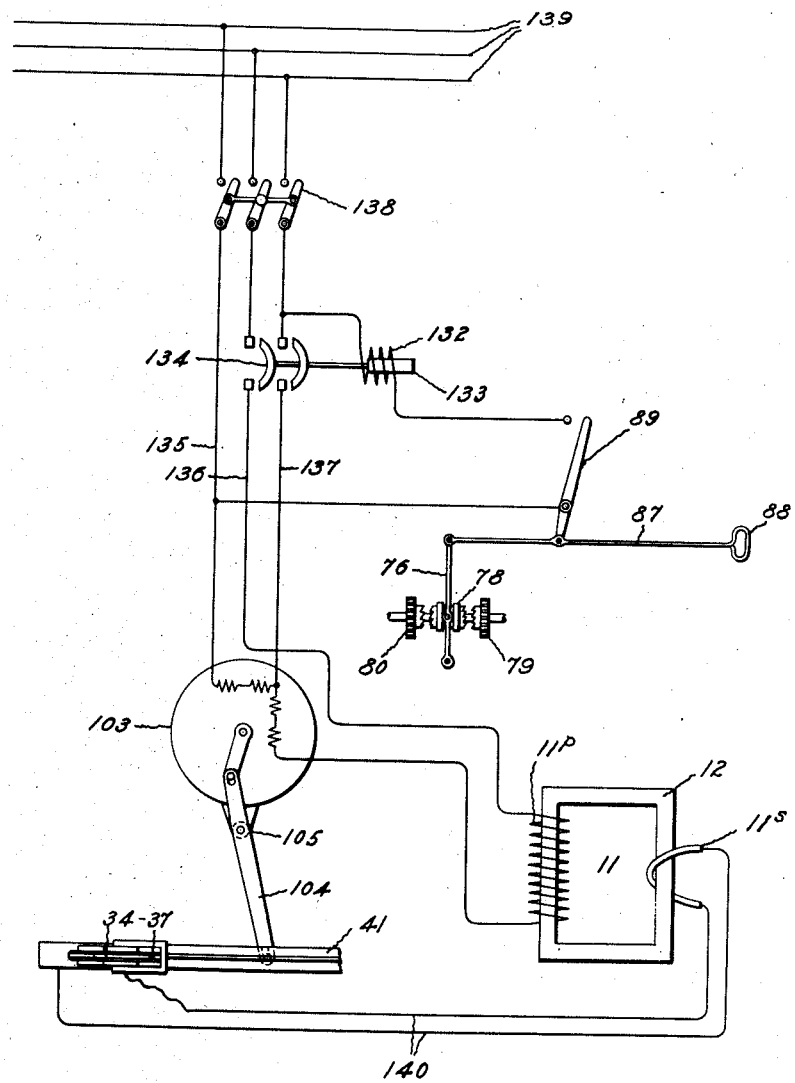

UNITED STATES PATENT OFFICE.

ROBERT E. WAGNER AND WESLEY E. LAIRD, OF PITTSFIELD, MASSACHUSETTS, ASSIGNORS TO GENERAL ELECTRIC COMPANY, A CORPORATION OF NEW YORK.

ELECTRIC WELDING-MACHINE.

1,282,502.　　　　　　Specification of Letters Patent.　　Patented Oct. 22, 1918.

Application filed April 20, 1918. Serial No. 229,687.

*To all whom it may concern:*

Be it known that we, ROBERT E. WAGNER and WESLEY E. LAIRD, citizens of the United States, residing at Pittsfield, county of Berkshire, State of Massachusetts, have invented certain new and useful Improvements in Electric Welding-Machines, (a continuation in part of our application filed January 10, 1918, Serial No. 211,121,) of which the following is a specification.

Our invention relates to electric resistance welding machines and comprises a machine particularly adapted for welding together metal sheets along an extended seam or line. Our welding machine is adapted, in one of its applications, to the welding of sheet steel edge to edge. In our former application we have described a machine for producing punchings from sheet metal which includes our novel welding machine as one of its parts. In the present application we desire to cover novel features of the welding machine as set forth with greater particularity in the appended claims.

In the accompanying drawings and following description, we have illustrated and described a preferred embodiment of our invention. Figure 1 is a side elevation of the welding machine; Fig. 2 is an elevation on a somewhat enlarged scale of the electrode end of the machine shown in Fig. 1; Fig. 3 is a view taken at right angles to Fig. 2, showing the electrode end of the machine partly in elevation and partly in section; Figs. 4 and 5 show details of an electrode support looking in the direction of the arrows 4, 4, and 5, 5, Fig. 1, respectively; Fig. 6 is an elevation of the complete welding machine connected to a voltage regulator; Fig. 7 shows in plan a mechanical connection between the induction regulator and the moving parts of the welding machine; Fig. 8 illustrates a modification of the lower electrode of the welding machine; Fig. 9 in elevation shows the clamps and adjusting mechanisms; Fig. 10 is an elevation of part of the mechanism of Fig. 9 looking in the direction of the arrows 10, 10; Fig. 11 is a sectional view illustrating a form of clutch and reversing mechanism for the moving welding electrode; and Fig. 12 is a diagram of the electrical circuits.

The welder as a whole, as shown in Fig. 6, is carried by a frame 9 which in turn is carried by the I-beams 10. This frame 9 carries a welding transformer 11, as shown in Figs. 1 and 12, comprising a primary winding $11^p$ and a cast copper secondary $11^s$ suitably disposed on the magnetic core 12. The secondary $11^s$ is substantially rectangular in shape, the rectangle being interrupted as usual at 13 by insulating material, and the parts being fastened together by insulated bolts 14.

The part of the secondary below the interruption carries and is connected to the lower electrode holding device consisting in general of two spaced arms 16 (see Figs. 3 and 6). The two arms 16 of the electrode carrier are connected by two bolts 17, 17'; these bolts pass through the arms 16, and one end of each bolt is provided with a nut 18, as illustrated in Fig. 3. At the other end each bolt passes fairly loosely through an arm 16 and is provided with a transverse shaft 19 which may be rotated by the handle 20. Each shaft 19 carries two eccentrically located disks 21, one at each side of the bolt. These eccentric disks bear at their edges against one of the arms 16 (or against a wearing plate 22 thereon) in such a manner that by rotating the shafts 19 by means of the handles 20, the arms 16 may be moved together or allowed to spring apart (to a small extent) something like the jaws of a vise.

The arms 16 are provided with coöperating upwardly facing ledges 23 (see Fig. 3) on which is carried the lower electrode adjusting member 24 which is provided with a handle 25 for moving same. The ledges 23 and the base of the member 24 are inclined downwardly to the right in Figs. 1 and 2 so that as the member 24 is moved to the left (in Figs. 1 and 2, or to the front in Figs. 3 and 6) the member 24 rises. The member 24 is provided with a slot 26 (see Fig. 2) through which one of the bolts 17 passes loosely. The slot 26 is of such length and of such an angle to the horizontal that the bolt passing through it does not interfere with the desired movements of the member 24. Coöperating with the electrode adjusting member 24 is another electrode adjusting member or support 27. Both of the members 24 and 27 are wedge-shaped and so arranged angularly that the upper surface or upper edge of the member 27 is horizontal and is continued horizontal as the member 24 is moved backward and forward. The member 27 is held against linear lengthwise movement (in the plane of the drawing in Fig. 2, perpendicular to the drawing in Fig. 3) by the outer bolt 17' at one end and by the arrangement of the devices at the other end, as appears clearly from Figs. 2 and 3. The arms 16 carry adjacent their upper edges two coöperating electrode clamping bars 28 which support the member 27 at its upper edge to maintain it in a vertical position, as shown in Fig. 3. The member 27 is free to move vertically except as it is restrained by the clamping action of the arms 16 through the bars 28.

Between the bars 28 and resting on the member 27 is the lower electrode 29 of the welder. This lower electrode 29 (as appears from Fig. 3), is a fairly thin plate (of substantially the same thickness as the member 27) the upper edge of which coöperates with an upper electrode. Both the upper and lower edges of the electrode 29 are beveled, as indicated, so that either edge may be used to coöperate with the upper electrode. It will now be apparent that the electrode 29 may be replaced, or raised or lowered, by turning the shafts 19 of the bolts 17, thereby allowing the arms 16 to spring apart slightly, thereafter raising or lowering the electrode 29 by moving the member 24 one way or the other by means of the handle 25 (or replacing the electrode 29 with another like it), and returning the handles 20 to their original position. In this position the eccentric disks 21 so act on the arms 16 that the electrode 29 is tightly grasped between the clamping bars 28 and thereby held firmly in position. During the welding operation good electrical contact therefore is maintained between the electrode 29 and the adjacent bars 28 which in turn are in contact with the arms 16 constituting one terminal of the welding transformer 11.

Fig. 8 shows a modification of the lower electrode. The electrode of this Fig. 8 comprises a large octagonal body member 31 in alternate sides of which are fastened the electrode members proper 32. Each of these members 32 is a long flat bar like 29 and the body member 31 is of the same length. The members 28 are modified as necessary and as indicated in dotted lines in Fig. 8, so that the lower half of the body member may lie loosely therein. The electrode of Fig. 8 provides four operating and wearing faces, that is, one wearing face on each of the bars 32 (instead of two wearing faces as provided for by the electrode 29). As the wearing face of one of the bars loses its shape, the body member 31 is removed from the member turned 90° (by means of the handle 33), thereby presenting a new member 32 as the welding face of the electrode, and the body member 31 is replaced in the members 28.

The upper movable welding electrode really comprises four roller electrodes 34, 35, 36 and 37 carried by frames 38 rotatable on the shaft 39. This shaft in turn is carried by the forked end of an electrode holder 40 which is movable lengthwise to roll one of the electrode wheels 34—37 from one end of the lower electrode 29 to the other and return the movable electrode to its original position. This construction is especially adapted to give good electric contact for current passing from the inner sides of the forked ends of the bar 40 through the frames 38 to the sides of the roller electrodes. This contact is greater than could be obtained by contact through the shaft alone. The heavy copper holder 40 and the inverted bar 41 having a T-shaped section (see Fig. 7), which is parallel to the holder 40 and attached to the same at both ends constitute together a sliding carriage for the rotatable welding head. At the rear end of the members 40 and 41 (that is at the end opposite the electrode) is a gear box 42 which contains a mechanism for driving the sliding carriage through its path.

The frame 38 carries four shafts 43 spaced 90° apart about the shaft 39 carrying the frame 38. One electrode wheel or roller 34—37 is revoluble on each one of these shafts 43.

Each of these electrode wheels or rollers comprises an annulus 44 which provides the welding operating or wearing face. This annulus is carried between two clamping members 45 and 46 which provides the electrode bearing on the shaft 43. The clamping member 46 is provided on its outer periphery with gear teeth 47. The clamping members 45 and 46 are attached together by removable bolts 48. When the operating face of an annulus 44 becomes too worn to be used further, this annulus 44 may be removed (after removing the whole electrode from the frame 38 by removing the corresponding shaft 43) by taking out the bolts 48 and removing the clamping member 45. Another annulus may therefore be readily substituted (or the same annulus repaired and replaced).

A hollow shaft 49 is rotatable on the shaft 39, as indicated in Fig. 3. This shaft 49 is attached at one end to the gear 50 and at the other to the gear 51. The gear 50 intermeshes with the teeth 47 on all of the electrode rollers 34—37. The gear 51 intermeshes with the worm 52 carried on the shaft 53, the worm 52 and gear 51 being inclosed in a casing as indicated. The shaft 53 carrying the worm 52 is driven from the gear box as is hereinafter described.

An annular projection 54 on the frame 38 is provided with four notches 55 disposed 90° apart about the center and at substantially equal distances between the centers of the electrode rollers 34—37. The annular ring 54 is also provided with four other notches 56 which, however, are one-sided or provided with an abrupt wall at but one side. Each notch 56 is disposed about midway of two notches 55. The arm which carries the frame 38 is provided adjacent the annular projection 54 with a spring-held catch 57 adapted to engage in the notches 55 and 56; the spring 57' tends to hold the catch 57 in one of the notches 55 or 56, but allows the withdrawal of the catch 57 to the outside periphery of the projection.

The movable electrode is provided with the plurality of rollers 34—37 and the elaborate mechanism above described in order that the welder may work substantially constantly, with certainty in the desired manner, and without interruption with minimum attention from the operator. As a roller electrode rolls along the fixed electrode 29, it is subjected to considerable heat which is concentrated at the fairly narrow edge of the roller. Consequently the welding face of any roller is rapidly destroyed unless the roller is used for such short periods of time and so intermittently that the temperature of the roller is kept fairly low. This is accomplished in the present case by the use of the four rollers, these four rollers being used successively, each being used to make one weld and then being replaced by another roller. The temperature of the lower electrode 29 does not rise prohibitively high because each point of its operating face is exposed to the high temperature of the weld only intermittently, and because of its length and mass and the radiating capacities of adjacent parts like the bars 28.

The shaft 49, through the gears 52 and 47, positively drives the roller electrode as the arm 40 is moved forward (by the gear box 42) to pass the movable electrode above the fixed electrode 29 and over the work to do the welding; the shaft 53 rotates the rollers 34—37 somewhat faster than they would naturally rotate if they were allowed to roll freely on the work as the arm advances. There is therefore a constant slipping between the roller electrode and the work.

Although the frame 38 is rotatable on the shaft 39 as before indicated, the frame 38 is held against rotation by the engagement between the catch 57 and the abrupt wall of one of the notches 56 during the welding operation, (that is, as the movable electrode is moved to the left in Figs. 1 and 2 to accomplish a weld). It will be observed that the frame tends to turn as the shaft 53 is rotated in the proper direction to rotate the rollers 34—37 in the forward or welding direction. The catch 57 holds the frame 38 against rotation. As each weld is completed and the electrode withdrawn toward its starting position, the rotation of the shaft 53 is likewise reversed in direction and the frame 38 is turned (counter-clockwise in Fig. 2). Since the notches 56 have no abrupt walls to restrain rotation in this reverse direction, this rotation can continue for the most for only approximately 45°, or until one of the notches 55 is moved under the catch 57 which thereupon again fixes the frame 38. This rotation of the frame allows the carriage to fall until the T-bar 41 is supported by the roller 69, which prevents a further downward movement of the carriage and automatically removes the movable welding electrode from the work (as all the rollers 34—37 are held some distance therefrom and from the lower electrode 29) so that the work may be removed from, and new work adjusted on the lower electrode 29 without hindrance from the upper electrodes. Furthermore, this rotation of the frame 38 tends to the desired successive use of the plurality of rollers 34—37, for before the second welding operation can be begun, the operator must withdraw the catch 37 from the notch in which it is caught and rotate the frame 38 another 45° by hand, and it is just as easy to present the succeeding electrode to the work as to return the one previously used.

The electrode holder 40 here illustrated comprises two heavy copper bar members 40$^a$ and 40$^b$ fastened together (see Figs. 4 and 5) in a triangular form although it may be cast on a single bar if desired. A stationary support or frame comprising two uprights 58 and 59 at the two sides of the holder 40 and fastened together above and below the holder 40 by the connection members 60, conducts current from the secondary 11$^s$ of the transformer (above the interruption 13) to the holder 40. From the holder 40 the current passes to the movable electrode, through the work (on the lower electrode 29), and from there back to the other side of the secondary 11$^s$ in a manner which will be understood from the foregoing description of the lower electrode and the devices for holding the same. These parts have been represented in Fig. 12 by the conductors 140. The upright 58 is provided with a triangular sectioned member 61 (see Fig. 4), the small end of the triangle pointing downward, which engages with one side of the triangular sectioned carrier 40 in such a manner that as the holder 40 is moved forward, it is maintained in close sliding contact with the member 61 and the opposite upright 59. The member 61 is held in close engagement with the holder 40 by gravity, and may rise and fall as required, a slot 62 in the upright 58 and the coöperating screw 63 (see Fig. 1) guiding the member 61 in its movement. By means of the uprights 58 and 59 and the triangular member 61 (coöperating with the triangular shape of the holder 40) good electrical contact is maintained between the secondary 11s and the holder 40 as the movable electrode is moved across the work. As may be seen in Fig. 1, the member 61 and the uprights 58 and 59 extend a considerable distance along the rod in order to provide a large area of contact with the rod.

Paralleling the holder 40 is the inverted T-beam or bar 41, which is linked to a voltage regulator, as later described. The two members 40 and 41 are attached together at their rear end (the end opposite the movable electrode) each being rigidly connected to the gear case 42. At their opposite ends the members 40 and 41 are joined together by vertical rods 65 as appears in Figs. 1 and 2. The movable electrode and the carriage or electrode holder comprising members 40 and 41 can be moved up and down (at the electrode end) by means of the lever 67 operating the roller 69, about the wheel or wheels which carry the gear case 42 (which are later described) as about a point. A weight 66 presses the movable electrode and the adjacent ends of the holder 40 and the rod 41 downward and (with their own weights) produces the requisite welding pressure.

After the movable electrode has completed a weld and some time before the succeeding weld is begun (in fact in order to allow the succeeding roller electrode to be brought to a welding position as described in a preceding paragraph) the movable electrode is raised manually away from the work by means of the lever 67 which is pivoted at 68 on the frame comprising the vertical members 58 and 59. This lever 67 is provided with a cam which carries the roller 69 supporting at this stage the weight of the welding carriage and welding head. The succeeding roller electrode 34—37 is now moved to the welding position as shown in Fig. 2. Returning the lever 67 to the position shown in Fig. 2 allows this electrode to press upon the work on the electrode 29. The welding operation then begins.

The gear case 42 is carried on wheels traveling on tracks (not shown). On the same shaft with the supporting wheels is mounted the gear wheel 71 rolling on the rack 72 (see Fig. 1). This rack extends so far along the rear extension of the supporting member or frame 9 that the gear case 42 may travel a distance at least nearly equal to the length of the lower welding electrode 29. The gear case 42 supports an electric motor 73 which is connected by a belt to the pulley 74. This pulley 74 in turn drives a shaft passing into the gear case 42 and which in its turn is connected to a reversing mechanism for driving the shaft 53 and the gears 71 (the latter through the gear 75) forward and backward. The principle of reversing mechanisms is well understood and it has not seemed necessary to complicate the drawing or the description by showing and describing other details of a suitable mechanism than those including the friction connection shown in Fig. 11. The reversing mechanism is controlled by a lever 76. The shaft 77 of Fig. 11 is driven from the motor 73 and rotates at all times that this motor is in operation. Keyed to this shaft, but slidable along it, is the connecting gear 78 which is toothed at both sides to engage with the teeth carried at the sides of the gears 79 and 80; these gears 79 and 80 rotate freely about the shaft 77. Each of these gears 79 and 80, when coupled to the connecting gear drives a chain of gears terminating in the wheel or wheels 71 and the shaft 53, these chains being so composed in any well-understood manner that one chain rotates these parts 71 and 53 in the opposite direction to the other chain. Thus, one of the gears 79 and 80 drives the gear case 42 in the forward direction and the other drives it in the reverse direction. By means of the lever 76 the connecting member 78 may be moved into engagement with either gear 79 or gear 80, depending on the direction of rotation of 71 and 53 desired; when any such engagement is made, the shaft rotates the corresponding gear and connected chain of gears.

The friction or slip connections are made between the side teeth of the gears 79 and 80 (that is, the teeth engaging with member 78) and the bodies of the gears 79 and 80. These slip connections are similar; only one need be described. The annular member 81 carries the teeth engaging with 78; it is provided with a projecting flange 82 and sets into a similarly shaped recess in the side of the body of the gear 80 against a layer 83 of friction material, for example, leather. The outer face of the flange 82 projects beyond the side of the body of 80, as shown. By means of a ring 84 engaging the outer face of the flange 82, and coöperating bolts 85 fastening the ring to the body of the gear 80, the member 81 may be engaged more or less tightly between the friction material 83 and the ring 84, and thereby more or less tightly held to the body of 80; the member 81 may therefore be arranged to slip within the body of the gear 80 under a predetermined stress. This friction of slip connection is provided to prevent damage to the machine, for example, breaking gear teeth, when starting and reversing, or if in any manner the movement of the gear case 42 is unduly interfered with while its driving wheels 71 are connected to the motor 73, the respective annular member 81 is so tensioned as to slip in its gear body before damage is done. The rods or pins 131 passing with a sliding fit through the gear 78 prevent the gears 79 and 80 from following the sliding gear 78 when it is shifted by the lever 76.

The operating lever 76 is connected to a rod 87 which extends to the front of the machine adjacent the electrodes and terminates at the grip 88. Intermediate its length this rod 87 is connected at 89 with the circuit breaker controlling the primary circuit of the welding transformer before described, so that when the reversing mechanism is in its neutral and reverse positions the circuit through the primary of the transformer is open but this circuit is closed in the forward position of the reversing mechanism when the electrodes advance to weld a joint. By means of the rod 87 the operator may start or stop the carriage in any position. At the rear of the machine is fastened the upright member 90 in the path of the lever 76 as the carriage 42 moves to the rear. By means of the slots and bolts at 91 the position of the member 90 may be adjusted. The operator may start the carriage 42 in the reverse direction and allow it to continue this movement without attention, for the carriage is automatically stopped by the member 90 when it ultimately engages the lever 76 and moves this lever 76 and the reversing gear to the neutral position as the movable electrodes reach their desired rearward position.

Coöperating with the stop 90 in automatically controlling the complete operation of the gear mechanism 42, is the movable stop 92. This stop is pivoted to the plate 93 which is adjustable by means of the bolts and slots shown. A stationary upright member 94 is provided with a stationary guide 95 so located that the movable stop 92 is guided between 94 and 95. The top of the fixed upright member 94 is beveled at its rear as indicated at 96, and behind the stop 92 (in Fig. 1) is a projecting portion 97, the top of which is somewhat below the top of the upright member 94. These parts coöperate with the latch 98 pivoted to the rear of the carriage 42. This latch 98 is so disposed that its forward end may engage both projection 97 and the beveled end 96 of the upright member 94. As the carriage 42 moves forward (to the left in Fig. 1), during the welding operation, the latch 98 engages the projection 97 just before the movable electrode reaches the forward end of its travel. As the carriage continues its advance after the latch 98 has engaged with the projection 97, the latch forces the stop 92 to the left about its pivot until the latch 98 rides so far up upon the beveled face 96 as to pass out of engagement with the projection. As the latch 98 leaves the projection 97 the weight 99 connected to the pivoted stop 92 by the arm 100, as illustrated, forces the stop 92 smartly to the right (in Fig. 1) against the reversing lever 76, with so much force as to carry the reversing lever 76 from its forward position, completely through its neutral position, and into its reversing position. Correspondingly the switch arm 89 of the circuit breaker in the primary circuit of the transformer, is moved to the right through its connection with the operating rod 87; the welding current is thereby discontinued and the carriage 42 and movable electrodes started in the reverse direction. Unless the operator earlier stops the carriage by manipulation of the operating rod 87, the rearward movement of the carriage 42 is stopped by the engagement of the reversing lever with the stop 90, as before indicated.

It will be understood that the welding electrodes and the electrical connections thereto are so insulated from the frame and other parts of the machine that there is no undue escape of the current for the electrodes. For example, the rod 40 is insulated from the gear box 42 by the sheets of insulation 131 (see Figs. 1 and 5), the bar 41 is insulated from the adjoining part of the gear case 42, and the welding transformer is insulated by the insulation 101 from the member 102 which attaches the transformer to the frame 9. Other insulating material is used as and where necessary and as will be readily understood; for example, the rod 53 has an insulating section, as partly shown in Fig. 5.

An induction regulator 103 is provided between the primary winding $11^p$ of the welding transformer and the source 139 supplying energy therefor, as best shown in Fig. 12. This induction regulator by a change in the angular relation of its windings changes the voltage impressed on the primary winding of the welding transformer during each forward or welding movement of the movable electrodes. As the movable electrodes move forward (to the left in Figs. 1 and 3) in making a weld, the impedance of the welding circuit is increased both by reason of increasing the length of conductor supplying the movable electrode (as the arm 40 projects farther to the left of the members 58 and 59 and the movable electrodes engage the work at greater distances along the stationary electrode 29) and by reason of the increased reactance of the welding circuit as the welding circuit is enlarged by the advance of the movable electrode and as more of the stock or work (generally iron or steel) being welded is interlinked with the welding circuit. Since the welding current tends to fall as the impedance of the welding circuit is increased the voltage regulator is adjusted to raise correspondingly the voltage impressed upon the primary of the welding transformer as each weld progresses. Preferably we so arrange the regulator that the current is substantially the same at all points of each weld, thus securing substantially the same quality of the weld at all points along each seam. The rotor of the induction regulator 103, therefore, is rotated as the movable electrode advances and to something like a proportional extent. This is accomplished (see Fig. 7) by means of the lever 104 which is pivoted intermediate its length to the regulator casing at 105. One end of this lever is pinned at 106 to the bar 41. The opposite end of the lever 104 is provided with an elongated slot 106' as illustrated, and an arm 107 (pinned to the crank 108 which rotates the rotor of the induction regulator) is provided with a pin 109 riding in the slot 106'. Correspondingly, as the arm advances with the movable electrode in making a weld, the rotor of the induction regulator is rotated, so as to raise the voltage impressed upon the primary winding of the welding transformer. As the arm retreats to return the movable electrode, the rotor is returned to its original position.

At both sides of the electrodes of the welder is disposed a mechanism for fixing or determining the position of the sheets at the weld and for clamping the stock in position with respect to the electrode while each weld is being made. These clamping and lap-measuring means are particularly illustrated in Figs. 9 and 10. The relation between these means and the welder is shown in Figs. 1 and 6. As appears in Fig. 1, this mechanism extends substantially the whole length of the lower electrode, and likewise a distance substantially equal to the width of the work. The lap-measuring means comprises at each side of the lower electrode 29, a plate 110 provided with three spacing fingers 111, 112 and 113, these fingers projecting toward the lower electrode 29. The plate 110 is loosely pinned at 114 to the spacing lever 115, this lever is loosely mounted on the shaft or pin 116 carried by the upright extension 117 from the welder frame 9. The middle finger 112 is provided with a short upright portion 118 provided with two oppositely extending cam members 119, the purpose of which is indicated later. Each shaft 116 also carries, loosely mounted upon it, the plate 120 of the clamping mechanism. This plate is provided with two broad fingers 121 and 122 (at opposite sides of the finger 112) which coöperate with the table 123 to clamp the ends of the sheets or stock to be welded as indicated. Another shaft 124 carried by the extension 117 from the frame 9 is provided with cam-shaped ends to which is fixed at both ends a clamping arm 125, which is pinned at 126 to the clamping plate 120. The shaft 124 also carries an upwardly projecting arm 127 by means of which it is operated. The upper face of the clamping plate 120 and the rearward portions of the clamping fingers 121 and 122, are inclined as shown, and the short cams 119 carried by the spacing finger 112 are adapted to ride along this inclined surface. A screw-threaded bolt 128 limits the downward movement of the spacing lever 115. As this lever is moved downward (at its free end) the spacing fingers 111, 112, 113 are projected toward the lower electrode of the welder and somewhat above this electrode, as appears at the left of Fig. 9. As the free end of the lever 115 is moved upward, the spacing plate 110 is drawn away from the lower electrode 29 and the cams 119 caused to ride up the inclined surface of the clamping plate 120; in this way the spacing fingers 111, 112 and 113 are moved upward out of the way of the movable electrodes, as appears at the right of Fig. 9, and as also appears from Fig. 6. As the upper ends of the clamping arms 127 are moved toward the electrodes of the welder, the clamping plates 120 and their fingers are pressed downward into engagement with any work that may be on the tables 123, clamping the work between the fingers 121, 122 and the tables 123. As the clamping arms are moved in the opposite direction, the work is released.

The operation of these devices is as follows: Suppose, as illustrated in Fig. 6, that one end of a metal sheet 129 is to be welded to the end of another metal sheet 130. Assume that sheet 129 has just been subjected to a welding operation and has been pulled to the left, as indicated in Figs. 6 and 9. In our application, Serial No. 211,121, we have described a take-up device (not shown herein) for pulling the sheet upwardly out of the way after it has been welded to the end of a preceding sheet. Before sheet 130 is introduced, the spacing lever 115' at the right of Fig. 9 is moved downward and the fingers 111—113 at the right of that figure are disposed on the table 123. These fingers terminate just to the right of the line 10—10. With the clamping arm 127 at the left of the figure depressed, or to the left, and its clamping plate 120 elevated, the end of the stock 129 is moved to the right or left until its free end is just adjacent the ends of the fingers 111—113 at the right of the figure. The clamping arm 127 at the left of Fig. 9 is then moved to the right and its clamping plate forced down upon the stock 129 and this stock thereby locked to the table 123 in contact with the lower electrode 29. The spacing fingers at the right of the figure are then elevated by lifting their spacing lever 115' to its vertical position illustrated. The opposite spacing lever 115, at the left of the figure, is then moved downward to the position shown and, with the right-hand clamping plate 120' elevated, the sheet 130 is introduced and moved to the position shown in which it abuts the ends of the fingers 111—113. It then overlaps the ends of the stock to the desired extent if the adjusting screws 128 have been properly positioned. Thereafter the clamping arm 127' at the right of the figure is moved to the left and the sheet 130 thereby clamped to the adjacent table 123 and following this the spacing lever 115 at the left of the figure is moved to its vertical position whereby its spacing fingers are elevated. The upper electrode is then swung into position for welding by releasing the catch 57 (see Fig. 2) from the notch 55 and raising the welding head by means of the lever 67 so that roller electrode 36 can be swung into position for welding. Lever 67 is now pushed back into the position shown in Fig. 2 allowing the full weight of the welding head to be carried by the roller electrode 36 in contact with the sheet 130. The machine is then ready for the welding operation.

The operator pulls forward the operating rod 87 (the motor 73 having been started) thereby causing the sliding gear 78 to be pulled into mesh with the gear (the motion being to the left in Fig. 1 and to the right in Fig. 12), and actuating the gear mechanism to cause the welding head to pass over the work. Simultaneously the switch 89 is closed, energizing the magnet 132 and causing its core 133 to close the line switch 134 in the supply conductors 135, 136, 137 connected to the welding transformer 11. The hand operated switch 138, used to sever connections with the mains 139, is understood to have been previously closed. As the weld progresses the voltage is raised by the regulator 103. When the weld is complete the gear 78 is automatically shifted to the gear 80, as already explained above, causing a retreat of the welding head. The switch 89 is opened by the shifting of the rod 76 opening the transformer supply circuit. The retreat of the welding head causes the roller electrode which has been in contact with the work to be angularly displaced, as already explained. The operator may now release the welded sheets and repeat the operation.

What we claim as new and desire to secure by Letters Patent of the United States, is,—

1. A welding machine comprising means for welding metal sheets together, and means operable by and in accordance with the motion of said welder for varying the voltage impressed on the welder as the welding progresses.

2. An electric welder comprising a movable electrode adapted to extend various distances from the stock, and means operable by the displacement of said movable electrode over the stock for automatically raising the voltage impressed on the welder as the inductance of the welding circuit increases.

3. A welding machine comprising means for welding metal sheets together by advancing an electrode across the stock, a voltage regulator controlling the impressed voltage, and means connecting said movable electrode and said regulator to raise the voltage impressed on the welder as the electrode advances along the joint for welding.

4. A welding machine for welding metal sheets together, said machine being provided with a plurality of roller welding electrodes adapted to be used interchangeably.

5. A welding machine for welding metal sheets together, said machine being provided with a plurality of welding electrodes adapted to be used successively, and means for automatically removing each of said electrodes out of welding relation to the work after it completes a welding operation.

6. An electric resistance welder provided with coöperating electrodes, one of which is movable, power means for moving said electrode along the joint to be welded, and a handle for simultaneously connecting said power means to said electrode and closing a circuit supplying energy for said coöperating electrodes.

7. A welding machine for welding metal sheets, said welder being provided with a movable electrode, power means for moving said electrode along the joint to be welded as the welding thereof progresses, and means for independently rotating said electrode as it moves over the joint.

8. A welding machine for welding metal sheets together, said welder being provided with a movable electrode, power means for moving said electrode forward and back along the joint, and means for automatically reversing the direction of travel of said electrode at the end of the forward movement thereof and for automatically stopping the backward movement of the electrode at the desired limit of its travel in that direction.

9. An electric resistance welder comprising coöperating electrodes, one of which is movable forward and back over the work along a line to be welded, and means for rotating said linearly displaced electrode at a rate differing from its progression over the work to cause a slipping between said rotating electrode and the work.

10. An electric resistance welder comprising a frame, an electrode carrier mounted thereon consisting of two arms spaced apart, a transverse shaft connecting said arms, means for moving said arms toward and away from each other, clamping bars carried by said arms, a stationary welding electrode adapted to be clamped between said bars and a movable electrode coöperating with said stationary electrode.

11. An electric resistance welder comprising electrodes for engaging with the work, one of said electrodes consisting of a movable supporting arm, a rotatable frame carried by said arm, a plurality of rotatable rollers carried by said frame, means for automatically rotating said frame through an arc at the end of a welding stroke to carry a roller out of contact with the work, and means for holding said roller out of contact with the work during a return stroke and until one of said rollers is placed at will into contact with the work.

12. An electric resistance welder having coöperating electrodes, one of said electrodes being movable back and forth along a seam to be welded, and the other being stationary during the welding operation, wedge-shaped adjustable supporting members for said stationary electrode, slidable over one another, and means for clamping said supporting members in different positions to adjust the height of said stationary electrode.

13. An electric resistance welder having coöperating electrodes, one of said electrodes being movable back and forth over the work and the other being stationary during the welding operation, a wedge-shaped supporting member for said stationary electrode, a second member having an inclined surface over which said wedge-shaped member is slidable, and means for clamping said wedge-shaped member in different positions to adjust the height of the said stationary electrode.

14. An electric resistance welder comprising a welding transformer, a fixed welding electrode which is clamped to one terminal of said secondary during welding, a coöperating electrode movable back and forth over the work, a triangular sectional supporting arm for said electrode, a triangular-sectioned member slidably connecting said supporting arm and said transformer secondary for maintaining electrical contact during the welding operation.

15. An electric resistance welder provided with coöperating electrodes, one of which is movable forward and back along a joint to be welded, power means for thus moving said electrode, and coöperating means for setting said power means in motion forward and closing a circuit supplying energy for said electrodes, and for reversing the direction of movement of said power means and opening said circuit.

16. An electric resistance welder provided with coöperating electrodes, clamps for holding the work in position with respect to said electrodes, and means for adjusting the position of one of said electrodes toward and from the work held in said clamps.

17. An electric resistance welder provided with a movable electrode carriage, a welding head thereon, power means for moving said carriage and head along a joint to be welded, and means for automatically raising an electrode on said head out of engagement with the work at the end of a welding stroke.

18. An electric resistance welder for metal sheets, comprising coöperating electrodes, a clamp at one side of said electrodes for clamping a metal sheet with respect to said electrodes, and means for determining a desired welding position of a second sheet with respect to the first sheet and said electrodes.

19. An electric resistance welder for metal sheets, comprising coöperating electrodes, a clamp at each side of said electrodes for clamping the sheets to be welded in the desired positions with respect to said electrodes, and means for measuring the desired welding positions of the sheets to be welded.

20. An electric resistance welder comprising coöperating electrodes, means for clamping work in a desired position with respect to said electrodes, and a finger movable toward and from the edge of a sheet to be welded to determine the desired position of that sheet with respect to the electrodes.

21. An electric resistance welder provided with a reciprocating electrode carriage, a welding head carried thereby and having one or more electrodes, power means for moving said welding head along a joint on the work to be welded, means for automatically raising an electrode on said welding head out of contact with the work at the end of a welding stroke and means for automatically changing the connection between said power means and said carriage to return said welding head.

22. An electric line welding machine comprising a supporting base, clamping means thereon for holding two bodies in a welding position, a fixed electrode in contact with one of said bodies, a carrier on said base, a welding head on said carrier and means for reciprocating said welding head along a line to be welded while in contact with another of said bodies.

23. An electric resistance welder having coöperating electrodes, one of which is rotatable, said rotatable electrode having side surfaces of large area and supporting members therefor having surfaces of substantially equal area affording good electrical contact with the side surfaces of said rotatable electrode.

24. An electric welder comprising coöperating electrodes, means for producing relative linear motion between the work to be welded and at least one of said electrodes, circuit connections for said electrodes and means for automatically raising the voltage impressed on the welder as the length of the welding circuit increases.

25. A resistance line welding machine comprising in combination a welding head adapted to be moved linearly over the work, a plurality of welding electrodes on said head, and means holding one of said electrodes in welding relation to the work on a welding stroke and permitting displacement of said work-engaging electrode away from the work upon a return stroke, and means for holding said electrode in a predetermined position out of welding relation to the work.

26. An electric resistance line welder having coöperating electrodes one of which is movable, power means for moving one of said electrodes forward and back along a joint to be welded, a clutch and reversing mechanism connecting said electrode with said power means, a handle for operating said mechanism to move said electrode through a welding stroke, means for automatically operating said reversing mechanism to reverse the direction of travel of said electrode at the end of a forward movement, an electrical switch in circuit with said electrode, and a connection between said handle and the clutch mechanism operating to close said switch during the welding stroke and open said switch during a reverse stroke.

27. An electric resistance line welding machine comprising coöperating electrodes, clamping means for holding an object to be welded in position, means for determining the welding position of said object with respect to said electrodes, means for determining a desired welding position of a second object with respect to said first object and means for independently holding said second object in position.

In witness whereof, we have hereunto set our hands this 16th day of April, 1918.

ROBERT E. WAGNER.
WESLEY E. LAIRD.